United States Patent
Huang et al.

(10) Patent No.: US 9,830,386 B2
(45) Date of Patent: Nov. 28, 2017

(54) DETERMINING TRENDING TOPICS IN SOCIAL MEDIA

(71) Applicant: Facebook, Inc., Menlo Park, CA (US)

(72) Inventors: Fei Huang, Boonton, NJ (US); Kay Rottmann, San Francisco, CA (US); Ying Zhang, Turlock, CA (US); Matthias Gerhard Eck, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 109 days.

(21) Appl. No.: 14/586,049

(22) Filed: Dec. 30, 2014

(65) Prior Publication Data

US 2016/0188703 A1 Jun. 30, 2016

(51) Int. Cl.
| | | |
|---|---|---|
| G06F 17/30 | (2006.01) | |
| G06Q 50/10 | (2012.01) | |
| G06F 17/27 | (2006.01) | |
| G06Q 30/02 | (2012.01) | |
| G06Q 50/00 | (2012.01) | |

(52) U.S. Cl.
CPC .... *G06F 17/30705* (2013.01); *G06F 17/2785* (2013.01); *G06Q 30/02* (2013.01); *G06Q 50/01* (2013.01); *G06Q 50/10* (2013.01)

(58) Field of Classification Search
USPC ........................................ 707/750, 772, 731
See application file for complete search history.

(56) References Cited

U.S. PATENT DOCUMENTS

| | | | |
|---|---|---|---|
| 5,293,581 A | 3/1994 | DiMarco et al. |
| 5,477,451 A | 12/1995 | Brown et al. |
| 5,510,981 A | 4/1996 | Berger et al. |
| 5,799,193 A | 8/1998 | Sherman et al. |
| 5,991,710 A | 11/1999 | Papineni et al. |
| 6,002,998 A | 12/1999 | Martino et al. |
| 6,157,905 A | 12/2000 | Powell |
| 6,161,082 A | 12/2000 | Goldberg |
| 6,223,150 B1 | 4/2001 | Duan et al. |
| 6,266,642 B1 | 7/2001 | Franz et al. |
| 6,304,841 B1 | 10/2001 | Berger et al. |
| 6,377,925 B1 | 4/2002 | Newman et al. |
| 6,393,389 B1 | 5/2002 | Chanod et al. |
| 6,629,095 B1 | 9/2003 | Wagstaff et al. |

(Continued)

OTHER PUBLICATIONS

U.S. Appl. No. 14/586,074 by Huang et al., filed Dec. 30, 2014.

(Continued)

*Primary Examiner* — Hung T Vy
(74) *Attorney, Agent, or Firm* — Perkins Coie LLP

(57) ABSTRACT

Technology is discussed herein for identifying comparatively trending topics between groups of posts. Groups of posts can be selected based on parameters such as author age, location, gender, etc., or based on information about content items such as when they were posted or what keywords they contain. Topics, as one or more groups of words, can each be given a rank score for each group based on the topic's frequency within each group. A difference score for selected topics can be computed based on a difference between the rank score for the selected topic in each of the groups. When the difference score for a selected topic is above a specified threshold, that selected topic can be identified as a comparatively trending topic.

20 Claims, 7 Drawing Sheets

(56) References Cited

U.S. PATENT DOCUMENTS

| | | |
|---|---|---|
| 7,054,804 B2 | 5/2006 | Gonzales et al. |
| 7,110,938 B1 | 9/2006 | Cheng et al. |
| 7,359,861 B2 | 4/2008 | Lee et al. |
| 7,533,019 B1 | 5/2009 | Riccardi et al. |
| 7,664,629 B2 | 2/2010 | Dymetman et al. |
| 7,813,918 B2 | 10/2010 | Muslea et al. |
| 7,827,026 B2 | 11/2010 | Brun et al. |
| 7,895,030 B2 | 2/2011 | Al-Onaizan et al. |
| 7,983,903 B2 | 7/2011 | Gao et al. |
| 8,015,140 B2 | 9/2011 | Kumar et al. |
| 8,145,484 B2 | 3/2012 | Zweig et al. |
| 8,175,244 B1 | 5/2012 | Frankel et al. |
| 8,204,739 B2 | 6/2012 | Lane et al. |
| 8,209,333 B2 | 6/2012 | Hubbard et al. |
| 8,265,923 B2 | 9/2012 | Chatterjee et al. |
| 8,275,602 B2 | 9/2012 | Curry et al. |
| 8,386,235 B2 | 2/2013 | Duan et al. |
| 8,543,580 B2 | 9/2013 | Chen et al. |
| 8,756,050 B1 | 6/2014 | Curtis et al. |
| 8,825,466 B1 | 9/2014 | Wang et al. |
| 8,825,759 B1 | 9/2014 | Ho et al. |
| 8,831,928 B2 | 9/2014 | Marcu et al. |
| 8,838,434 B1 | 9/2014 | Liu |
| 8,874,429 B1 | 10/2014 | Crosley et al. |
| 8,897,423 B2 | 11/2014 | Nanjundaswamy |
| 8,935,150 B2 | 1/2015 | Christ |
| 8,942,973 B2 | 1/2015 | Viswanathan |
| 8,949,865 B1 | 2/2015 | Murugesan et al. |
| 8,983,974 B1 | 3/2015 | Ho et al. |
| 8,990,068 B2 | 3/2015 | Orsini et al. |
| 8,996,352 B2 | 3/2015 | Orsini et al. |
| 8,996,353 B2 | 3/2015 | Orsini et al. |
| 8,996,355 B2 | 3/2015 | Orsini et al. |
| 9,009,025 B1 | 4/2015 | Porter et al. |
| 9,031,829 B2 | 5/2015 | Leydon et al. |
| 9,104,661 B1 | 8/2015 | Evans |
| 9,183,309 B2 | 11/2015 | Gupta |
| 9,231,898 B2 | 1/2016 | Orsini et al. |
| 9,245,278 B2 | 1/2016 | Orsini et al. |
| 9,336,206 B1 | 5/2016 | Orsini et al. |
| 9,477,652 B2 | 10/2016 | Huang et al. |
| 9,734,142 B2 | 8/2017 | Huang |
| 9,734,143 B2 | 8/2017 | Rottmann et al. |
| 9,740,687 B2 | 8/2017 | Herdagdelen et al. |
| 9,747,283 B2 | 8/2017 | Rottmann et al. |
| 2002/0087301 A1 | 7/2002 | Jones et al. |
| 2002/0161579 A1 | 10/2002 | Saindon et al. |
| 2002/0169592 A1 | 11/2002 | Aityan |
| 2003/0040900 A1 | 2/2003 | D'Agostini et al. |
| 2004/0002848 A1 | 1/2004 | Zhou et al. |
| 2004/0049374 A1 | 3/2004 | Breslau et al. |
| 2004/0098247 A1 | 5/2004 | Moore |
| 2004/0122656 A1 | 6/2004 | Abir et al. |
| 2004/0243392 A1 | 12/2004 | Chino et al. |
| 2005/0021323 A1 | 1/2005 | Li et al. |
| 2005/0055630 A1 | 3/2005 | Scanlan et al. |
| 2005/0228640 A1 | 10/2005 | Aue et al. |
| 2006/0111891 A1 | 5/2006 | Menezes et al. |
| 2006/0206798 A1 | 9/2006 | Kohlmeier et al. |
| 2006/0271352 A1 | 11/2006 | Nikitin et al. |
| 2007/0130563 A1 | 6/2007 | Elgazzar et al. |
| 2007/0136222 A1 | 6/2007 | Horvitz |
| 2008/0046231 A1 | 2/2008 | Laden et al. |
| 2008/0077384 A1 | 3/2008 | Agapi et al. |
| 2008/0281578 A1 | 11/2008 | Kumaran et al. |
| 2009/0070095 A1 | 3/2009 | Gao et al. |
| 2009/0083023 A1 | 3/2009 | Foster et al. |
| 2009/0132233 A1 | 5/2009 | Etzioni et al. |
| 2009/0182547 A1 | 7/2009 | Niu et al. |
| 2009/0198487 A1 | 8/2009 | Wong et al. |
| 2009/0210214 A1 | 8/2009 | Qian et al. |
| 2009/0276206 A1 | 11/2009 | Fitzpatrick et al. |
| 2009/0281789 A1 | 11/2009 | Waibel et al. |
| 2009/0326912 A1 | 12/2009 | Ueffing et al. |
| 2010/0042928 A1 | 2/2010 | Rinearson et al. |
| 2010/0121639 A1 | 5/2010 | Zweig et al. |
| 2010/0149803 A1 | 6/2010 | Nakano et al. |
| 2010/0161642 A1 | 6/2010 | Chen et al. |
| 2010/0194979 A1 | 8/2010 | Blumenschein et al. |
| 2010/0223048 A1 | 9/2010 | Lauder et al. |
| 2010/0228777 A1* | 9/2010 | Imig ............... G06F 17/30699 707/772 |
| 2010/0241416 A1 | 9/2010 | Jiang et al. |
| 2010/0283829 A1 | 11/2010 | De Beer et al. |
| 2010/0299132 A1 | 11/2010 | Dolan et al. |
| 2011/0099000 A1 | 4/2011 | Rai et al. |
| 2011/0137636 A1 | 6/2011 | Srihari et al. |
| 2011/0246172 A1 | 10/2011 | Liberman et al. |
| 2011/0246881 A1 | 10/2011 | Kushman et al. |
| 2011/0252027 A1 | 10/2011 | Chen et al. |
| 2011/0282648 A1 | 11/2011 | Sarikaya et al. |
| 2012/0005224 A1 | 1/2012 | Ahrens et al. |
| 2012/0029910 A1 | 2/2012 | Medlock et al. |
| 2012/0035907 A1 | 2/2012 | Lebeau et al. |
| 2012/0035915 A1 | 2/2012 | Kitade et al. |
| 2012/0047172 A1 | 2/2012 | Ponte et al. |
| 2012/0059653 A1 | 3/2012 | Adams et al. |
| 2012/0101804 A1 | 4/2012 | Roth et al. |
| 2012/0109649 A1 | 5/2012 | Talwar et al. |
| 2012/0123765 A1 | 5/2012 | Estelle et al. |
| 2012/0130940 A1 | 5/2012 | Gattani et al. |
| 2012/0138211 A1 | 6/2012 | Barger et al. |
| 2012/0158621 A1 | 6/2012 | Bennett et al. |
| 2012/0173224 A1 | 7/2012 | Anisimovich et al. |
| 2012/0209588 A1 | 8/2012 | Wu et al. |
| 2012/0253785 A1 | 10/2012 | Hamid et al. |
| 2012/0330643 A1 | 12/2012 | Frei et al. |
| 2013/0018650 A1 | 1/2013 | Moore et al. |
| 2013/0060769 A1 | 3/2013 | Pereg et al. |
| 2013/0084976 A1 | 4/2013 | Kumaran et al. |
| 2013/0103384 A1 | 4/2013 | Hunter et al. |
| 2013/0144595 A1 | 6/2013 | Lord et al. |
| 2013/0144603 A1 | 6/2013 | Lord et al. |
| 2013/0144619 A1 | 6/2013 | Lord et al. |
| 2013/0173247 A1 | 7/2013 | Hodson et al. |
| 2013/0246063 A1 | 9/2013 | Teller et al. |
| 2013/0317808 A1 | 11/2013 | Kruel et al. |
| 2014/0006003 A1 | 1/2014 | Soricut et al. |
| 2014/0006929 A1 | 1/2014 | Swartz et al. |
| 2014/0012568 A1 | 1/2014 | Caskey et al. |
| 2014/0025734 A1* | 1/2014 | Griffin ............... G06Q 50/01 709/204 |
| 2014/0059030 A1 | 2/2014 | Hakkani-Tur et al. |
| 2014/0081619 A1 | 3/2014 | Solntseva et al. |
| 2014/0108393 A1* | 4/2014 | Angwin ........... G06F 17/30705 707/731 |
| 2014/0163977 A1 | 6/2014 | Hoffmeister et al. |
| 2014/0172413 A1 | 6/2014 | Cvijetic et al. |
| 2014/0195884 A1 | 7/2014 | Castelli et al. |
| 2014/0207439 A1 | 7/2014 | Venkatapathy et al. |
| 2014/0229155 A1 | 8/2014 | Leydon et al. |
| 2014/0279996 A1 | 9/2014 | Teevan et al. |
| 2014/0280295 A1 | 9/2014 | Kurochkin et al. |
| 2014/0280592 A1 | 9/2014 | Zafarani et al. |
| 2014/0288913 A1 | 9/2014 | Shen et al. |
| 2014/0288917 A1 | 9/2014 | Orsini et al. |
| 2014/0288918 A1 | 9/2014 | Orsini et al. |
| 2014/0303960 A1 | 10/2014 | Orsini et al. |
| 2014/0335483 A1 | 11/2014 | Buryak et al. |
| 2014/0337007 A1 | 11/2014 | Fuegen et al. |
| 2014/0337989 A1 | 11/2014 | Bojja et al. |
| 2014/0350916 A1 | 11/2014 | Jagpal et al. |
| 2014/0358519 A1 | 12/2014 | Dymetman et al. |
| 2014/0365200 A1 | 12/2014 | Sagie |
| 2014/0365460 A1* | 12/2014 | Portnoy ............ G06F 17/30867 707/710 |
| 2015/0006143 A1 | 1/2015 | Skiba et al. |
| 2015/0006219 A1* | 1/2015 | Jose ............... G06Q 10/1095 705/7.19 |
| 2015/0033116 A1 | 1/2015 | Severdia et al. |
| 2015/0046146 A1 | 2/2015 | Crosley et al. |
| 2015/0066805 A1 | 3/2015 | Taira et al. |
| 2015/0120290 A1 | 4/2015 | Shagalov |
| 2015/0134322 A1 | 5/2015 | Cuthbert et al. |

(56) References Cited

U.S. PATENT DOCUMENTS

| | | |
|---|---|---|
| 2015/0142420 A1 | 5/2015 | Sarikaya et al. |
| 2015/0161104 A1 | 6/2015 | Buryak et al. |
| 2015/0161110 A1 | 6/2015 | Salz |
| 2015/0161112 A1 | 6/2015 | Galvez et al. |
| 2015/0161114 A1 | 6/2015 | Buryak et al. |
| 2015/0161115 A1 | 6/2015 | Cenero et al. |
| 2015/0161227 A1 | 6/2015 | Buryak et al. |
| 2015/0213008 A1 | 7/2015 | Orsini et al. |
| 2015/0228279 A1 | 8/2015 | Moreno et al. |
| 2015/0293997 A1 | 10/2015 | Smith et al. |
| 2015/0363388 A1 | 12/2015 | Green et al. |
| 2016/0041986 A1 | 2/2016 | Nguyen |
| 2016/0048505 A1 | 2/2016 | Tian et al. |
| 2016/0092603 A1 | 3/2016 | Rezaei et al. |
| 2016/0117628 A1 | 4/2016 | Brophy et al. |
| 2016/0162473 A1 | 6/2016 | Hedley et al. |
| 2016/0162477 A1 | 6/2016 | Orsini et al. |
| 2016/0162478 A1 | 6/2016 | Blassin et al. |
| 2016/0162575 A1 | 6/2016 | Eck et al. |
| 2016/0177628 A1 | 6/2016 | Juvani |
| 2016/0188575 A1 | 6/2016 | Sawaf |
| 2016/0188576 A1 | 6/2016 | Huang et al. |
| 2016/0188661 A1 | 6/2016 | Zhang et al. |
| 2016/0217124 A1 | 7/2016 | Sarikaya et al. |
| 2016/0239476 A1 | 8/2016 | Huang et al. |
| 2016/0267073 A1 | 9/2016 | Noeman et al. |
| 2016/0299884 A1 | 10/2016 | Chioasca et al. |
| 2016/0357519 A1 | 12/2016 | Vargas et al. |
| 2017/0011739 A1 | 1/2017 | Huang et al. |
| 2017/0083504 A1 | 3/2017 | Huang |
| 2017/0169015 A1 | 6/2017 | Huang |
| 2017/0177564 A1 | 6/2017 | Rottmann et al. |
| 2017/0185583 A1 | 6/2017 | Pino et al. |
| 2017/0185586 A1 | 6/2017 | Rottmann et al. |
| 2017/0185588 A1 | 6/2017 | Rottmann et al. |
| 2017/0270102 A1 | 9/2017 | Herdagdelen et al. |

OTHER PUBLICATIONS

Notice of Allowance dated Mar. 1, 2017, for U.S. Appl. No. 14/981,769 by Rottmann, K., et al., filed Dec. 28, 2015.
Final Office Action dated Jul. 1, 2016, for U.S. Appl. No. 14/302,032 of Herdagdelen, A., filed Jun. 11, 2014.
International Search Report and Written Opinion for International Application No. PCT/US2015/051737, dated Jul. 28, 2016, 22 pages.
Koehn, P. et al., "Statistical Phrase-Based Translation," Proceedings of the 2003 Conference of the North American Chapter of the Association for computational Linguistics on Human Language Technology—vol. 1, Assoc. for Computational Linguistics, 2003, p.
Non-Final Office Action dated Dec. 17, 2015, for U.S. Appl. No. 14/302,032 of Saint Cyr, L., filed Jun. 11, 2014.
Non-Final Office Action dated Dec. 21, 2016, for U.S. Appl. No. 14/586,022 of Huang, F., filed Dec. 30, 2014.
Non-Final Office Action dated Feb. 9, 2017, for U.S. Appl. No. 14/559,540 of Eck, M. et al., filed Dec. 3, 2014.
Non-Final Office Action dated Jan. 12, 2017, for U.S. Appl. No. 15/275,235 of Huang, F. et al., filed Sep. 23, 2016.
Non-Final Office Action dated Jan. 19, 2017, for U.S. Appl. No. 14/980,654 of Pino, J. et al., filed Dec. 28, 2015.
Non-Final Office Action dated Jul. 28, 2016, for U.S. Appl. No. 14/861,747 of F. Huang, filed Sep. 22, 2015.
Non-Final Office Action dated Mar. 10, 2016, for U.S. Appl. No. 14/621,921 of Huang, F., filed Feb. 13, 2015.
Notice of Allowance dated Apr. 13, 2017, for U.S. Appl. No. 14/973,387 of Rottmann, K., et al., filed Dec. 17, 2015.
Notice of Allowance dated Apr. 19, 2017, for U.S. Appl. No. 14/981,769 by Rottmann, K., et al., filed Dec. 28, 2015.
Notice of Allowance dated Apr. 20, 2017 for U.S. Appl. No. 14/302,032 by Herdagdelen, A., et al., filed Jun. 11, 2014.
Notice of Allowance dated Apr. 7, 2017 for U.S. Appl. No. 14/861,747 by Huang, F., et al., filed Sep. 22, 2015.
Notice of Allowance dated Jul. 18, 2016, for U.S. Appl. No. 14/621,921 of Huang, F., filed Feb. 13, 2015.
Notice of Allowance dated Nov. 30, 2016, for U.S. Appl. No. 14/302,032 of Herdagdelen, A., filed Jun. 11, 2014.
Sutskever, I., et al., "Sequence to sequence learning with neural networks," Advances in Neural Information Processing Systems, pp. 3104-3112, 2014.
U.S. Appl. No. 14/302,032 of Herdagdelen, A et al., filed Jun. 11, 2014.
U.S. Appl. No. 14/559,540 of Eck, M et al., filed Dec. 3, 2014.
U.S. Appl. No. 14/586,022 of Huang, F. et al., filed Dec. 30, 2014.
U.S. Appl. No. 14/621,921 of Huang, F., filed Feb. 13, 2015.
U.S. Appl. No. 14/861,747 by Huang, F., filed Sep. 22, 2015.
U.S. Appl. No. 14/967,897 of Huang F. et al., filed Dec. 14, 2015.
U.S. Appl. No. 14/980,654 of Pino, J. et al., filed Dec. 28, 2015.
U.S. Appl. No. 15/199,890 of Zhang, Y. et al., filed Jun. 30, 2016.
U.S. Appl. No. 15/244,179 of Zhang, Y., et al., filed Aug. 23, 2016.
U.S. Appl. No. 15/275,235 of Huang, F. et al., filed Sep. 23, 2016.
U.S. Appl. No. 15/445,978 by Herdagdelen, A., et al., filed Feb. 28, 2017.
Vogel, S. et al., "HMM-Based Word Alignment in Statistical Translation." In Proceedings of the 16th Conference on Computational Linguistics—vol. 2, Association for Computational Linguistics, 1996, pp. 836-841.
Final Office Action dated Jun. 16, 2017, for U.S. Appl. No. 14/586,022 of Huang, F. et al., filed Dec. 30, 2014.
Notice of Allowance dated Jun. 6, 2017, for U.S. Appl. No. 14/981,794 by Rottman, K., et al., filed Dec. 28, 2015.
Non-Final Office Action dated Jun. 26, 2017, for U.S. Appl. No. 15/445,978 of Herdagdelen, A., filed Feb. 28, 2017.
Non-Final Office Action dated Dec. 30, 2016 in U.S. Appl. No. 14/586,074 by Huang, F. et al., filed Dec. 30, 2014.
Non-Final Office Action dated Nov. 9, 2016, for U.S. Appl. No. 14/973,387 by Rottmann, K., et al., filed Dec. 17, 2015.
Non-Final Office Action dated Oct. 6, 2016, U.S. Appl. No. 14/981,794 of Rottmann, K. filed Dec. 28, 2015.
U.S. Appl. No. 14/973,387, of Rottmann, K., et al., filed Dec. 17, 2015.
U.S. Appl. No. 14/981,769 by Rottmann, K., et al., filed Dec. 28, 2015.
U.S. Appl. No. 14/981,794 by Rottmann, K., et al., filed Dec. 28, 2015.
Zamora, J.D., et al., "Tweets language identification using feature weightings," Proceedings of the Twitter language identification workshop, Sep. 16, 2014, 5 pages.
Extended European Search Report for European Application No. 16161095.1, dated Feb. 16, 2017, 4 pages.
U.S. Appl. No. 15/644,690 of Huang, F. et al., filed Jul. 7, 2017.
Notice of Allowance dated Jul. 12, 2017, for U.S. Appl. No. 14/981,794 by Rottmann, K., et al., filed Dec. 28, 2015.
Supplemental Notice of Allowability dated Jul. 13, 2017, for U.S. Appl. No. 14/981,769 by Rottmann, K., et al., filed Dec. 28, 2015.
Corrected Notice of Allowability dated Jul. 13, 2017, for U.S. Appl. No. 14/973,387 of Rottmann, K., et al., filed Dec. 17, 2015.
Final Office Action dated Aug. 10, 2017 for U.S. Appl. No. 15/275,235 by Huang, F. et al. filed Sep. 23, 2016.
Final Office Action dated Aug. 25, 2017 for U.S. Appl. No. 14/980,654 by Pino, J. et al., filed Dec. 28, 2015.
Non-Final Office Action dated Aug. 25, 2017 for U.S. Appl. No. 15/652,175 by Herdagdelen, A., filed Jul. 17, 2017.
Non-Final Office Action dated Aug. 29, 2017 for U.S. Appl. No. 14/967,897 by Huang, F., filed Dec. 14, 2015.
Notice of Allowance dated Aug. 30, 2017 for U.S. Appl. No. 14/559,540 by Eck, M. et al. filed Dec. 3, 2014.
Notice of Allowance dated Aug. 4, 2017, for U.S. Appl. No. 14/981,794 by Rottman, K., et al., filed Dec. 28, 2015.
Notice of Allowance dated Jul. 26, 2017, for U.S. Appl. No. 14/586,074 by Huang, F., et al., filed Dec. 30, 2014.
U.S. Appl. No. 15/652,144 of Rottmann, K., filed Jul. 17, 2017.
U.S. Appl. No. 15/654,668 of Rottmann, K., filed Jul. 19, 2017.
U.S. Appl. No. 15/672,690 of Huang, F., filed Aug. 9, 2017.

(56) References Cited

OTHER PUBLICATIONS

U.S. Appl. No. 15/696,121 of Rottmann, K. et al., filed Sep. 5, 2017.
Final Office Action dated Sep. 8, 2017 for U.S. Appl. No. 15/445,978 of Herdagdelen, A. filed Feb. 28, 2017.
Notice of Allowability dated Sep. 12, 2017 for U.S. Appl. No. 14/981,794 by Rottman, K., et al., filed Dec. 28, 2015.
Notice of Allowability dated Sep. 19, 2017 for U.S. Appl. No. 14/559,540 by Eck, M. et al. filed Dec. 3, 2014.
Notice of Allowance dated Oct. 10, 2017 for U.S. Appl. No. 15/275,235 for Huang, F. et al., filed Sep. 23, 2016.
Notice of Allowance dated Oct. 23, 2017 for U.S. Appl. No. 15/445,978 of Herdagdelen, A. filed Feb. 28, 2017.
U.S. Appl. No. 15/723,095 of Tiwari, P. filed Oct. 2, 2017.

* cited by examiner

DETERMINING TRENDING TOPICS IN SOCIAL MEDIA

BACKGROUND

Users spend an immense amount of time interacting with content on social media websites. On one popular social media website, for example, over a billion active users spend a total of over ten million hours each month interacting with the website. These users can often produce hundreds of millions of content posts each day. When users access such websites, the social media web site can select content such as other users' posts, news feeds, event notifications, and advertisements to display to the users. Selecting content items that users are likely to find helpful or relevant increases the chances that users will interact with those content items and that they will return to the website in the future.

Over time, topics and actions discussed on social media fall into and out of favor. Topics or actions that are currently being performed or discussed are referred to as "trending." Determining trending topics and actions can be extremely valuable in selecting content items or in convincing advertisers to utilize social media channels to reach potential customers. For example, trending topics and actions can be helpful to inform marketing decisions, to provide recommendations for other users, to predict resource usage, to draw analogies to other similar topics and actions, etc. However, classifying a topic or action as trending can be difficult. For example, trends that may exist for a segment of social media contributors, such as those who share a particular geographical location, may not be readily apparent from an analysis of general social media posts. Furthermore, performing an in-depth analysis on combinations of the millions of social media posts that are created every hour can become computationally intractable.

DETAILED DESCRIPTION

Figure 1:
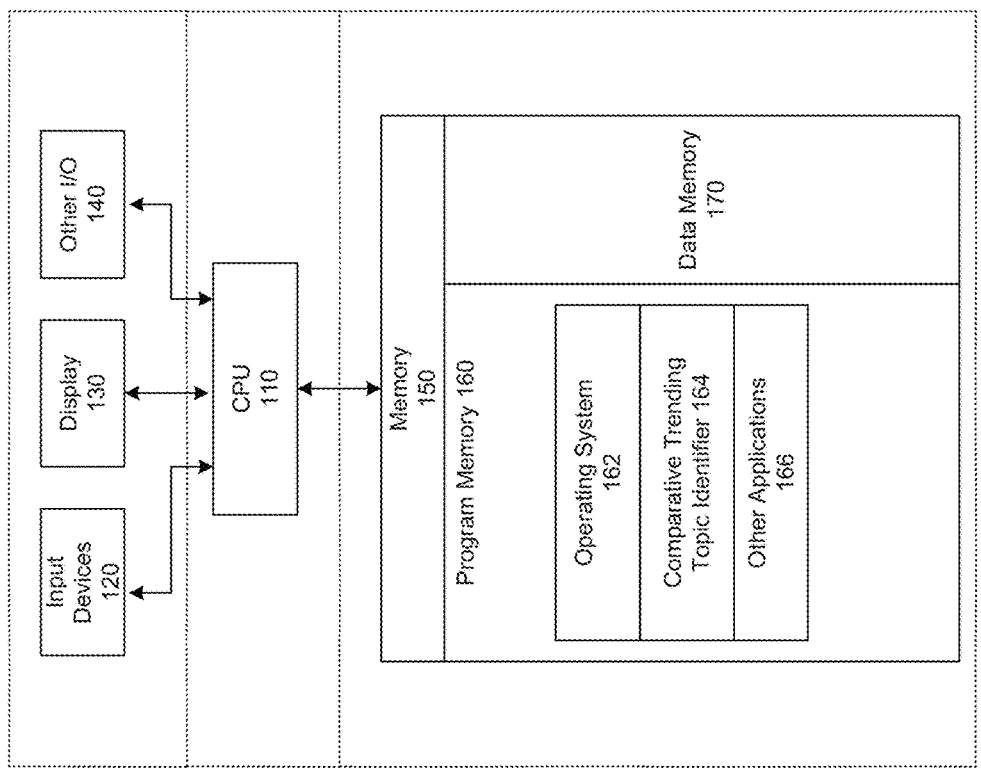
FIG. 1 is a block diagram illustrating an overview of devices on which some embodiments of the disclosed technology can operate.

Identifying trending topics by computing a difference score for the use of a topic between two groups of content items is discussed herein. Groups of content items can be selected based on various parameters, pertaining to the author of the content items, such as age, location, gender, etc., or based on information about content items, such as when they are posted or what keywords they contain. Determining trending topics as a comparison between two groups of content items can inform a decision of which content items to provide to users who match the parameters of a group for which a topic is trending. Determining trending topics as a comparison between two groups of content items can also provide valuable information about the sources of the content items, such as associations between keyword used as a parameter for one of the content item groups and a trending topic found for that content item group.

Topics of interest can be identified by comparing topic rankings across groups of posts. A "topic," as used herein, can be any term or phrase (n-gram). A "post," as used herein, can be any content item containing language including text, images, audio, video, or other multi-media. As examples, a post can be anything used in a social media site such as a wall post, comment, status update, message, fan post, news story, event, etc.

Two groups of posts can be identified using various parameters including: the posts in each group including particular content such as a keyword, URL, image, video, etc.; content items being posted to a particular location such as a fan page, comments on a news item, etc.; or content item authors of the posts have particular characteristics such as being in specified locations, being within a specified age range, being of a particular gender, speaking a particular language, holding a specified belief, being associated with a particular organization or group, etc. Additional details regarding obtaining groups of posts are discussed below in relation to FIG. 5.

Topics which may be of interest can be selected from within each group of posts based on various scores such as: 1) a value indicating an overall frequency of the topics within that group of posts or 2) a value indicating a frequency of posts that contain the topics. To accomplish this, topic rankings can be assigned to each of at least some of the terms in each group, to create lists of ranked topics. Additional details regarding creating a list of ranked topics for a group of posts are discussed below in relation to FIG. 6. A difference (or similarity) value between topic rankings in each group can be assigned. Topics with a difference value above a threshold can be identified as comparatively trending topics. As used herein, "comparatively trending topics," refers to topics that have been identified, based on this difference in topic ranking values across two groups of posts, as topics that are trending more in one group as compared to the second group. Additional details regarding identifying comparatively trending topics using two ranked lists of topics are discussed below in relation to FIG. 7.

In some implementations, identification of comparatively trending topics can be used to select content items or to determine appropriate advertising for particular users. For example, a first group can be defined for users between ages 16-19 and a second group can be defined for all users. By creating a ranked list of topics and finding topics that have a comparatively high score for the first group as compared to the second group, a determination can be made that for users between ages 16-19, a comparatively trending topic is "Ford Mustang." Based on this determination, when a user who is between 16-19 years old accesses a website, and it has been determined this user may be in the market for a new car, an advertisement for a Ford Mustang can be provided. An advertisement for this car that is currently popular with 16-19 year olds may be more likely to receive interest than other car advertisements. As another example, the topic "Lord of the Rings" may be comparatively trending for users in the United States as compared to users in China. When users sign onto a social media website who both live in the United States and are following a "Lord of the Rings" fan page, they may be shown the most recent posts on the "Lord of the Rings" fan page.

In some embodiments, comparatively trending topics can be used to discover information about the sources of the groups used for the identification of the comparatively trending topics. For example, two groups of posts may be selected from posts by users in New York and in San Francisco. A comparatively trending topic "coding" may be found for San Francisco based on a comparatively high rank for "coding" in posts from the San Francisco group as compared to posts from the New York group. This may indicate to a company looking to hire programmers that there is a higher interest in programming in San Francisco than in New York. As another example, a politician using his own name "Mike McCloud," as a keyword can find a first group of posts that identify the keyword. By using a random sampling of other posts for comparison, topics that are comparatively trending in posts that use the keyword but not in posts generally can be identified. Such comparatively trending topics could be "foreign policy," "untrustworthy," and "vice president." These comparatively trending topics can tell the politician how he is viewed, what issues or weaknesses he should address, topics for which he is popular, etc.

Several embodiments of the described technology are discussed below in more detail in reference to the figures. Turning now to the figures, FIG. 1 is a block diagram illustrating an overview of devices 100 on which some embodiments of the disclosed technology may operate. The devices can comprise hardware components of a device 100 that identifies comparatively trending topics. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 includes program memory 160 that stores programs and software, such as an operating system 162, Comparative Trending Topic Identifier 164, and any other application programs 166. Memory 150 also includes data memory 170 that can include content items singularly or in ranked lists, content item classifications and keyword indexes, content item author information, sorting and ranking data, lists of common words, comparatively trending topic to content item mappings, configuration data, settings, user options, or preferences which can be provided to the program memory 160 or any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
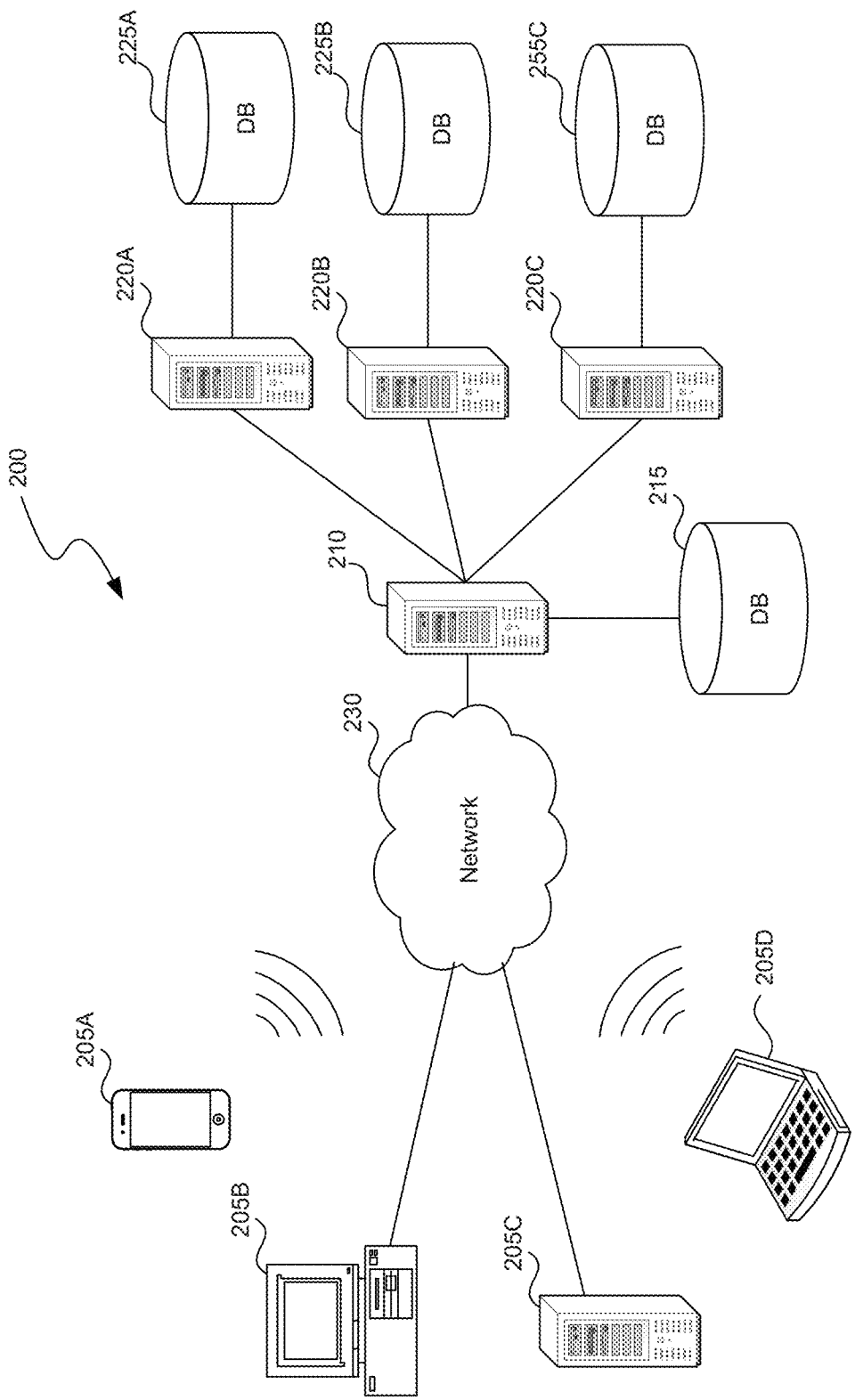
FIG. 2 is a block diagram illustrating an overview of an environment in which some embodiments of the disclosed technology can operate.

FIG. 2 is a block diagram illustrating an overview of an environment 200 in which some embodiments of the disclosed technology may operate. Environment 200 can include one or more client computing devices 205A-D, examples of which may include device 100. Client computing devices 205 can operate in a networked environment using logical connections 210 through network 230 to one or more remote computers such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 may correspond to a group of servers, and each of these servers can share a database or can have their own database. Databases 215 and 225 can warehouse (e.g. store) information such as content items, content item classifications and keyword indexes, content item author information, sorting and ranking data, lists of common words, comparatively trending topic to content item mappings, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
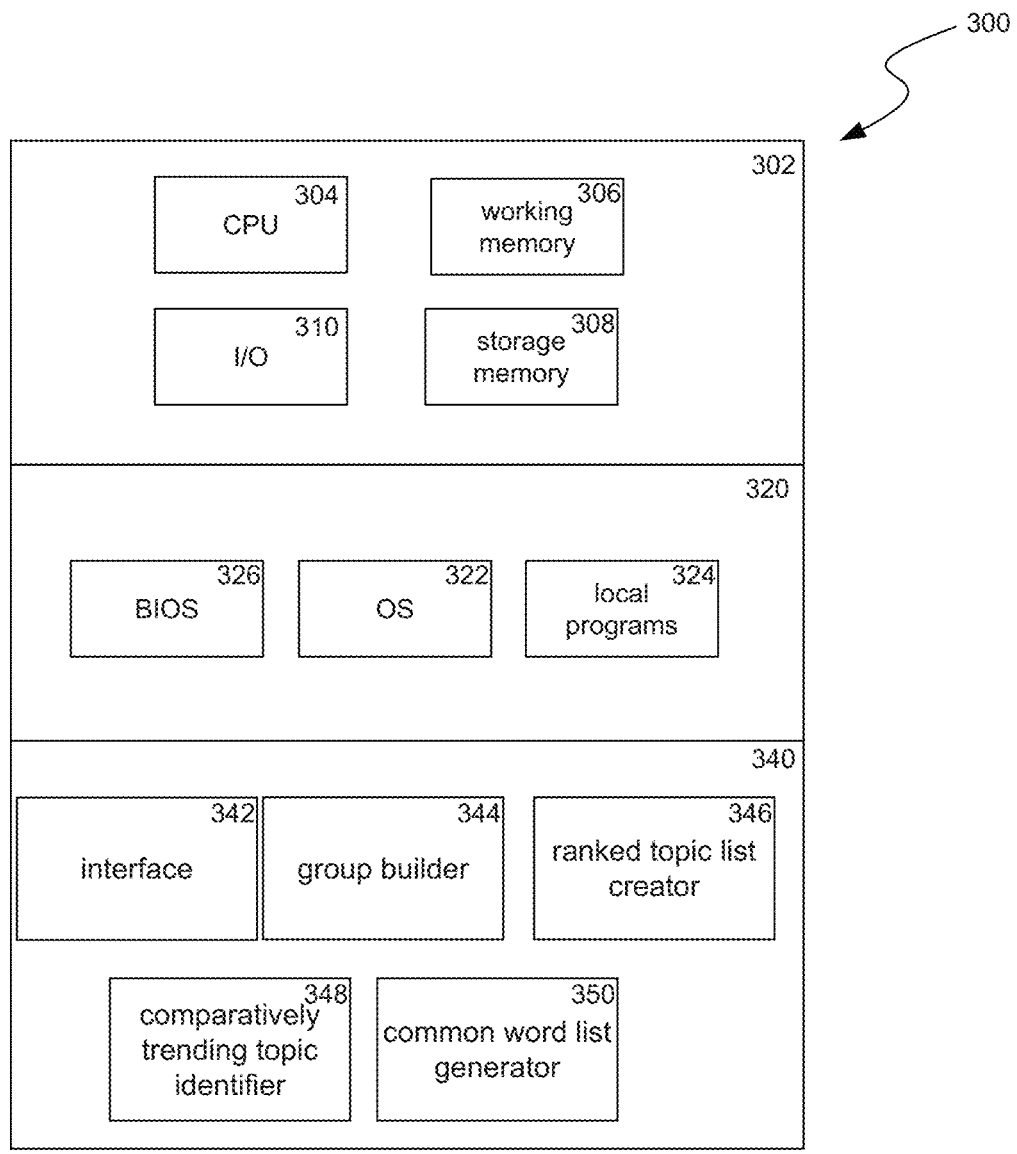
FIG. 3 is a block diagram illustrating components which, in some embodiments, can be used in a system implementing the disclosed technology.

FIG. 3 is a block diagram illustrating components 300 which, in some embodiments, can be used in a system implementing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as a local program 324. Specialized components 340 can include group builder 344, ranked topic list creator 346, comparatively trending topic identifier 348, common word list generator 350, and components which can be used for controlling and receiving data from the specialized components, such as interface 342.

Group builder 344 can be configured to identify one or more groups of posts based on group parameters. Parameters such as a post timeframe, keyword(s) that the posts contain, where a post is posted, or parameters for post authors such as age, gender, or location can be passed to group builder 344 through interface 342. Any first set of parameters to select a first group of posts and any second set of parameters to select a second group of posts can be used. In various implementations, parameters can be fixed for both groups, can use default values for unspecified parameters, or can be independent of each other.

In some implementations, a set of parameters, such as one or more keywords, can define a first group of posts and a second group of posts can be created by taking a random cross section of posts. For example, the parameter for a first group could be the keyword "smartphone." A first group of posts can be selected which contain this, or a variation on this, keyword. A second group of posts for term comparison can be randomly or semi-randomly (e.g. within a timeframe, within a topic area, within a language, within an area) selected.

In some implementations, a set of parameters with corresponding types can be received for a first group and a single parameter with one of the types of the set of parameters can be received. A first group of posts can be retrieved using the received set of parameters and a second group of posts can be retrieved using the same set of parameters except that the single parameter can replace the parameter of the corresponding type in the set. For example, a first set of parameters could be-time//posts within the last three months; author location: San Diego; and author gender// female. A received single parameter could be location: Dallas. The first group of posts would be posts within the last three months by women in San Diego; the second group would be posts within the last three months by women in Dallas. Building post groups is discussed below in more detail in relation to FIG. 5.

Ranked topic list creator 346 can be configured to receive a group of posts, such as from group builder 344, and create a corresponding ranked list of topics. Topics from the group of posts can receive a score indicating the number of occurrences of the topic in the group of posts, without regard to which post each instance of the topic is from. This score is referred to herein as a "term frequency" (TF). For example, if the group of posts contains three posts: "I love Obama, Obama is the best" and "How did Obama ever get into office? Let's impeach Obama," and "I think the president is doing a fine job," then the TF for the term "Obama" would be based on the count of the time "Obama" is used: four.

Alternatively or in addition to the term frequency, post topics can receive a score based on the number of posts they are found in, that is, whether the term is common or rare across all posts, independent of how many times they appear in a post. This score is referred to herein as the document frequency (DF). Continuing the previous example, the DF for the term "Obama" would be based on the count of the posts in which "Obama" appears: two. In some implementations, an inverse of the document frequency (IDF) is used. In some implementations, the IDF of a topic is computed by dividing the total number of posts by the number of posts containing the topic, and then taking the logarithm of that quotient. The term frequency and either the document frequency or inverse document frequency can be combined, such as by taking their product, to obtain a TFIDF score. Using any combination of these scores, topics from the group can be ranked in a list with a rank score. Creating ranked topic lists is discussed below in more detail in relation to FIG. 6.

Comparatively trending topic identifier 348 can be configured to receive two ranked topic lists, such as from ranked topic list creator 346, and compare the two ranked topic lists to identify comparatively trending topics. A rank score, as either a TFIDF score or a list position, for each topic on the first list can be compared to a corresponding score for that topic on the second list and a difference value can be computed. A default rank score such as 0 can be used for topics that do not appear on one of the lists. In some implementations, a topic's difference score can be adjusted based on objective factors, such as how common the topic is within one or both groups of posts. For example, in an implementation where difference scores are on a 0-1 scale, a topic that occurs in 75% of the posts with a difference score of 0.6 can be adjusted to be higher than the difference score for a topic that occurs in 5% of the posts with a difference score of 0.75.

Topics with a sufficiently large difference score can be selected as comparatively trending topics, such as those that are above a threshold value. Identifying comparatively trending topics is discussed below in more detail in relation to FIG. 7.

Common word list generator 350 can be configured to determine highly ranked words that appear in both of two groups of posts. Common word list generator 350 can receive two ranked topic lists, such as from ranked topic list creator 346. Common word list generator 350 can then identify topics that have a rank above a threshold on both lists. Generating common word lists is discussed below in more detail in relation to FIG. 4.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
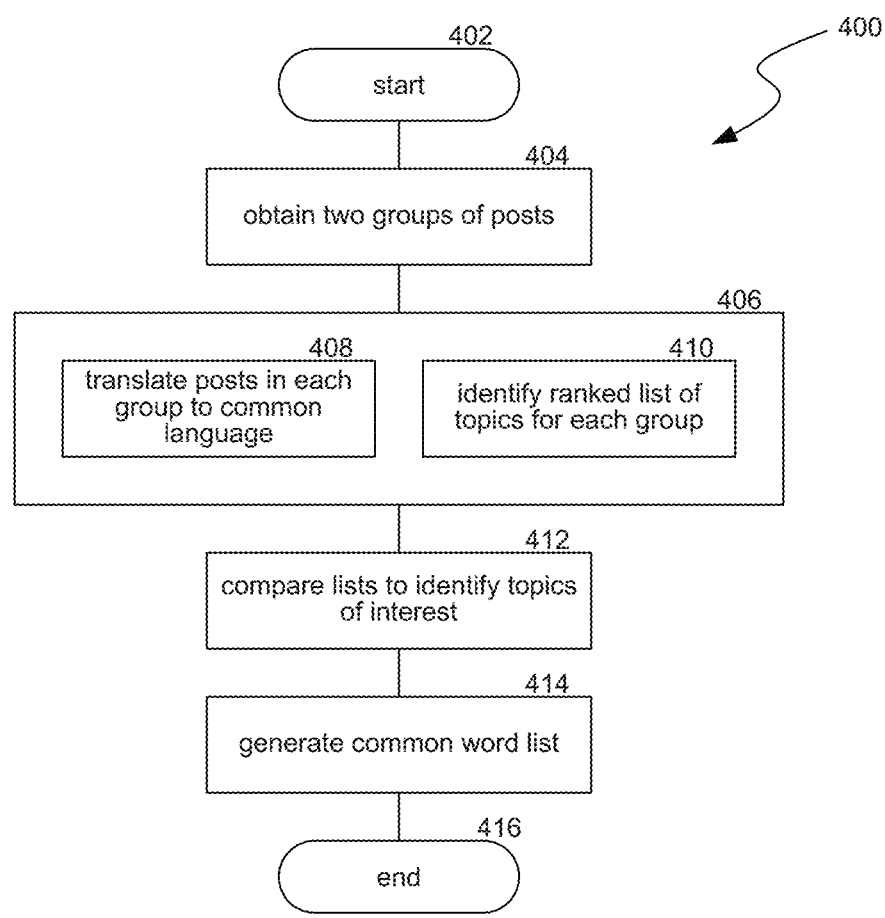
FIG. 4 is a flow diagram illustrating a process used in some embodiments for determining trending topics based on a comparison between two post groups.

FIG. 4 is a flow diagram illustrating a process 400 used in some embodiments for determining trending topics based on a comparison between two post groups. Process 400 begins at block 402 and continues to block 404. At block 404 two groups of posts are obtained. In some implementations, more than two groups of posts can be used. Each group of posts can be selected using a set of one or more parameters. Parameters can be any factor that can be used to distinguish a set of posts. Parameters can specify qualities about posts such as: keywords, phrases, or ideas; length; language; post classifications assigned by the author or assigned by a computing system based on an analysis of the posts, etc. Parameters can specify qualities about a source or author of posts such as a location, age, gender, race, belief, biometric, group association, friend relationships, type of content the author generally interacts with, etc. Parameters can specify qualities about externals of posts, such as where they are posted, when they were posted, what type of device they were posted from, a range of IP addresses the posts came from, etc. Obtaining two groups of posts based on parameters is discussed in more detail below in relation to FIG. 5.

Block 406 comprises blocks 408, translating posts into a common language, and 410, identifying a ranked list of topics for each post group. In some implementations, the operations of block 408 occur prior to the operations of block 410. In some implementations, the operations of block 410 occur prior to the operations of block 408. At block 408 a common language is chosen and any posts that are not in the common language are translated into the common language. Post translations can be performed using a machine translation engine or by human translation. At block 410 a ranked list of topics is identified for each post group. A ranked list of topics for a post group is a data structure where one or more topics identified from the post group are organized according to a score assigned to each topic. In some implementations, assigning a score to topics is based on a TF score, an IDF score, or a combination scores. Identifying a ranked list of topics for a post group is discussed in more detail below in relation to FIG. 6.

At block 412 a first and a second ranked list of topics identified at block 410 are compared to identify comparatively trending topics. Comparatively trending topics are identified by finding topics on the first ranked list that have a score or rank significantly different from the score or rank for that topic on the second ranked list. Identifying comparatively trending topics is discussed in more detail below in relation to FIG. 7.

At block 414, a common word list can be created. A common word list is a data structure identifying words that have a score above a threshold or are ranked above a threshold on both lists. In some implementations, process 400 continues to block 416 without creating a common word list. At block 416, process 400 ends.

Figure 5:
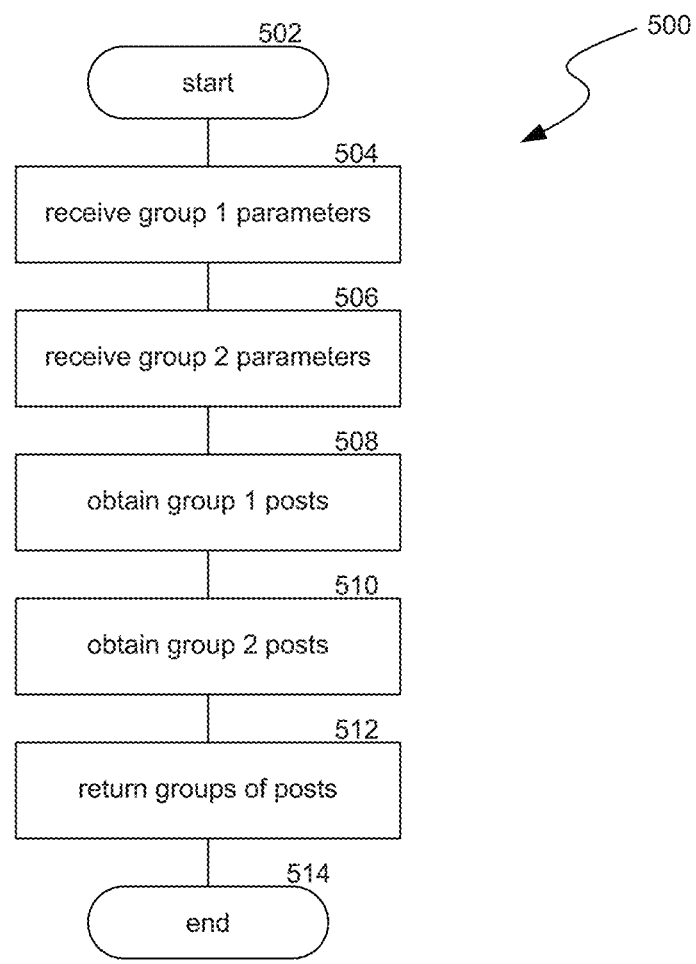
FIG. 5 is a flow diagram illustrating a process used in some embodiments for selecting two post groups.

FIG. 5 is a flow diagram illustrating a process 500 used in some embodiments for selecting two post groups based on parameters. Process 500 begins at block 502 and continues to block 504. At block 504 a first set of parameters are received. As discussed above in relation to block 404, parameters can be any criteria useful to select a group of posts. Such criteria can include specifications for the content of posts, for the author of posts, for the source or context of posts, or a minimum or maximum number of posts. Examples of parameters include: post keywords or topics, post length, post languages, particular authors, author age, author gender, author orientation; author location, other author biometrics or physical characteristics, authors being in an identified friend network, a history of authors interacting with a particular type of content items, a source device, or an IP range. In some implementations, defaults can be used for one or more parameters.

At block 506, a second set of parameters is received. In some implementations, the second group of parameters is received independent of the first set of parameters. For example, the first set of parameters could specify posts by men in Beijing while the second set of parameters could specify posts that came from an Android device that are at least 200 characters long. In some implementations, the second set of parameters identifies a difference from the first set of parameters. In these implementations, parameters from the first set of parameters that are not specified as different in the second set of parameters can be included in the second set of parameters. For example, a first set of parameters could specify location: Hawaii, author age: 20-30, keyword: beach, and a second set of parameters could specify author age: 25-45. In this example of this implementation, the first set of parameters can be used to find posts that contain the word "beach" and that are by authors in Hawaii who are between 20 and 30 years old and the second set of parameters can be used to find posts that contain the word "beach" and that are by authors in Hawaii who are between 25 and 45 years old. In some implementations, the second set of parameters can specify that a random or semi-random (e.g. within a timeframe, within a topic area, within a language, within an area) group of post should be selected.

At block 508 a first group of posts that match the first set of parameters is obtained. At block 510 a second group of posts that match the second set of parameters is obtained. In some implementations, such as where the parameters define a minimum number of posts and a minimum number of posts matching all the parameters are not available, posts matching only some of the parameters can be obtained. In some implementations, if the minimum number of posts cannot be obtained process 500 can end without returning a result. In some implementations, if the minimum number of posts cannot be obtained process 500 proceeds with less than the minimum number of posts. At block 512 the first group of posts obtained at block 508 and the second group of posts obtained at block 510 are returned. Process 500 ends at block 514.

Figure 6:
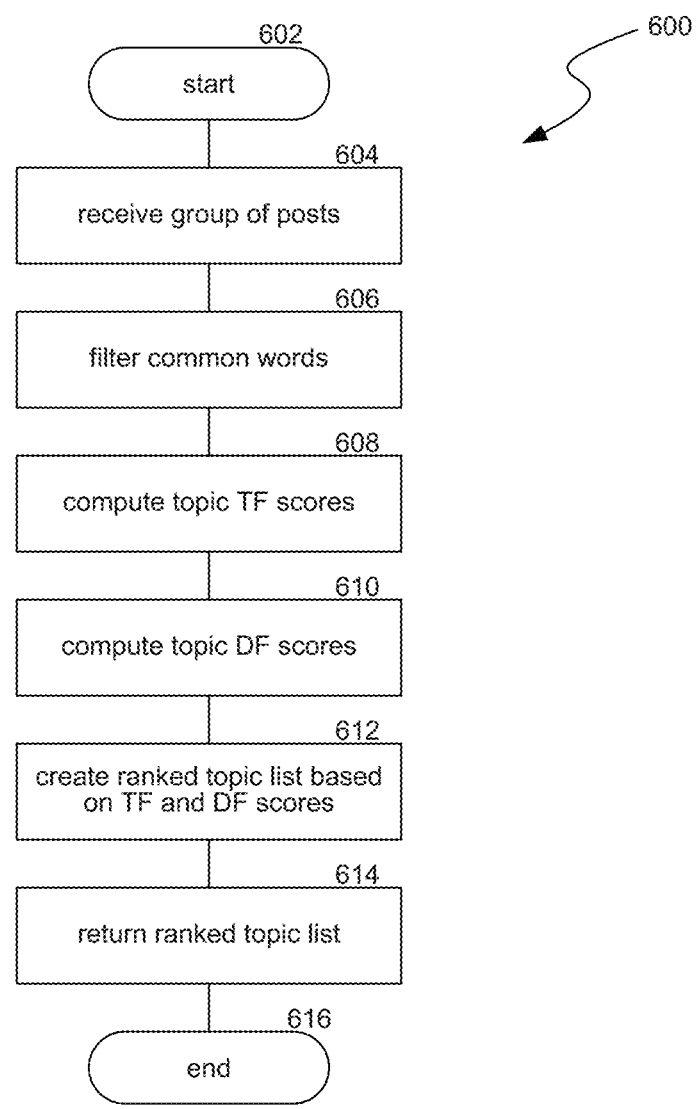
FIG. 6 is a flow diagram illustrating a process used in some embodiments for creating a ranked list of topics for a post group.

FIG. 6 is a flow diagram illustrating a process 600 used in some embodiments for creating a ranked list of topics for a post group. Process 600 begins at block 602 and continues to block 604. At block 604 a group of posts, such as a group created by process 500, is received. The group of posts can comprise one or more topics. Topics can be identified using a specified maximum n-gram length, such as five words. Each combination of consecutive words in the posts that are less than or equal to the n-gram length can be identified.

At block 606, in some implementations, topics that are considered too common can be filtered to remove them from consideration. This can be accomplished by matching topics to a list of common topics. For example, topics on the list of common topics (i.e., topics to ignore) could include the words "the," "a," "of," "and," "or," and other common words and phrases.

At block 608, a term frequency score can be assigned to each remaining topic from the received group of posts. A term frequency score (TF) is an indication of the number of times a term appears in the group of posts, including duplicates within a single post.

At block 610, a document frequency score can be assigned to each remaining topic from the received group of posts. A document frequency score is an indication of the number of posts a topic appears in, without regard to duplicates within particular posts. In some implementations, a document score is an inverse document score (IDF). In some implementations, the IDF score is computed by dividing the total number of posts by the number of posts containing the topic, and then taking the logarithm of that quotient.

At block 612 a ranked list of topics can be created based on the TF and IDF scores assigned to each topic in blocks 608 and 610. In some implementations, the ranked list of topics is sorted according to a rank score assigned to each topic computed by the product of that topic's TF and IDF scores. In some implementations, the ranked list of topics can be created based on either or both of the TF and IDF scores, and rank scores can be assigned to each topic based on that topics location on the ranked list of topics or any combination of the TF and IDF scores.

At block 614 the ranked list of topics created at block 612 is returned. Process 600 then continues to block 616, where it ends.

Figure 7:
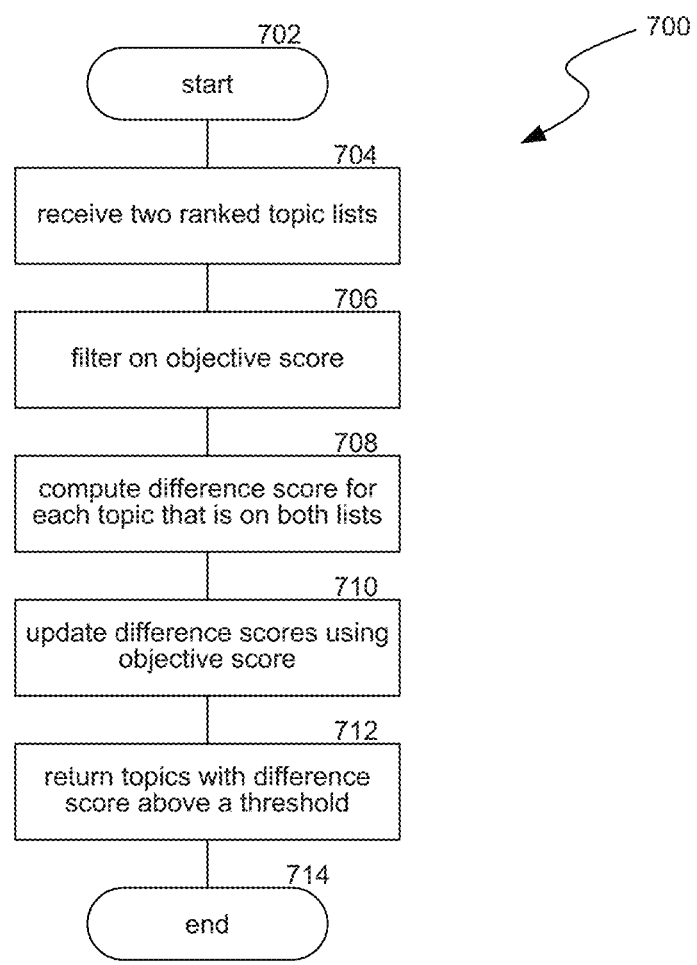
FIG. 7 is a flow diagram illustrating a process used in some embodiments for comparing two ranked lists of topics to identify comparatively trending topics.

FIG. 7 is a flow diagram illustrating a process 700 used in some embodiments for comparing two ranked lists of topics to identify comparatively trending topics. Process 700 begins at block 702 and continues to block 704. At block 704 two ranked lists, such as ranked lists created by process 600, are received.

While process 700 finds topics that have a difference in rank scores between the two ranked topic lists that is above a threshold, in some implementations it may be desirable to only find such topics that are also sufficiently prevalent. For example, "dog" may be used in 3 of 1,000 posts of a first post group and in 15 of 500 posts of a second post group, and have a difference score of 0.5 on a 0-1 scale. Furthermore, "cat" may be used in 100 of the 1,000 posts of the first post group and on 200 of the 500 posts of the second post group, but only have a difference score of 0.4 on a 0-1 scale. Due to the objectively low prevalence of "dog," despite it appearing five time more often in the second group of posts, it can be filtered out of consideration as a comparatively trending topic. In some implementations, topics that determined to be too common to be useful as comparatively trending topics can be fileted. For example, a list of words such as "the" "it" and "a" can be created based on a frequency that those words appear in all posts or in a cross-section of posts. Topics that appear on this list of common words can be removed from ranked lists. In these implementations, process 700 can be configured, at block 706, to filter out, from both ranked topic lists, topics with an objective score, such as a TF, IDF, TFIDF, or list ranking, topics determined to be too common to be useful as comparatively trending topics.

At block 708 a difference score for each remaining topic on the ranked lists of topics can be computed. A difference score can be computed by taking the absolute value of the difference of a first rank score of a topic from a first ranked topic list and a second rank score of the same topic from a second ranked topic list. As an example, a difference score for the topic "peacoat" could be computed by: finding a first rank score of 60 for "peacoat" on a ranked list created from a post group for men in San Francisco, Calif.; finding a second rank score of 20 for "peacoat" on a ranked list created from a post group for men in Trenton, N.J.; and computing a difference score for "peacoat" of 60−20=40. In some implementations, the difference score for each topic can be associated with an identification of the group from which the topic has a higher rank score. In some implementations, when a topic is on one list but not the other, a default rank score, such as zero, can be used for the rank score from the list that does not contain the topic. In some implementations, a topic rank score from a ranked topic list can be the TFIDF score assigned to that topic on the list. In some implementations, a topic rank score from a ranked topic list can be based on the location of the topic on the list, such as an index number or a percentage from the top or bottom of the list.

Similarly to block 706, in some implementations, it may be more interesting to receive comparatively trending topics that are also more common even though they do not have the highest difference score. To this end, the difference scores can be adjusted according to objective scores, such as a TF, IDF, TFIDF, or list ranking. At block 710, in these implementations, the difference score assigned to one or more topics can be weighted according to an objective score. For example, a difference score for a first topic, expressed as a ratio between the ranked lists of topics, of 2:1 where the first topic occurs in 75% of posts may be adjusted to be higher than for a topic with a difference score of 3:1 where the second topic only occurs in 10% of posts.

At block 712 topics with a difference score above a threshold value are identified as comparatively trending topics and returned. In various implementations, a corresponding difference score or rating score is also returned with identified comparatively trending topics. These scores can be used to determine which among identified comparatively trending topics are trending more or is more important. In some implementations, topics with a difference score below a threshold can be selected to be returned by process 700.

Several embodiments of the disclosed technology are described above in reference to the figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means a value for an item under comparison is above a specified other value, that an item under comparison is among a certain specified number of items with the largest value, or that an item under comparison has a value within a specified top percentage value. As used herein, being below a threshold means a value for an item under comparison is below a specified other value, that an item under comparison is among a certain specified number of items with the smallest value, or that an item under comparison has a value within a specified bottom percentage value. As used herein, being within a threshold means a value for an item under comparison is between two specified other values, that an item under comparison is among a middle specified number of items, or that an item under comparison has a value within a middle specified percentage range.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

We claim:

1. A method, performed by a computing system, for identifying comparatively trending topics, comprising:
   receiving, by the server, as post parameters to an interface of the computing system, one or more parameters that distinguish social media postings;
   obtaining, by the server, over a network and based on the received post parameters, two groups of posts;
   generating, by the server, a first ranked list of topics for a first group of the two groups of posts by:
      identifying, by the server, as first group topics, topics from the first group of posts wherein members of the first group topics each comprise one or more words; and
      computing, by the server, a first rank score for each of the topics of the first group topics;
   generating, by the server, a second ranked list of topics for a second group of the two groups of posts by:
      identifying, by the server, as second group topics, topics from the second group of posts wherein members of the second group topics each comprise one or more words; and
      computing, by the server, a second rank score for each of the topics of the second group topics;
   associating, by the server, with a selected one of the first group topics from the first ranked list of topics, a difference score computed, by the computing system, as a difference between:
      the rank score for the selected one of the first group topics, and
      a corresponding rank score determined based on the second ranked list of topics;
   comparing, by the server, the difference score to a specified threshold;
   in response to determining that the difference score is above the specified threshold, identifying, by the server, the selected one of the first group topics as a comparatively trending topic.

2. The method of claim 1 wherein the post parameters comprise at least one of:
   one or more keywords;
   one or more topics;
   post length or a post length range;
   one or more languages;
   one or more specific authors;
   one or more times or time frames;
   author age or author age range;
   one or more author genders;
   one or more author locations;
   one or more author biometrics;
   one or more identified friend networks which an author is a part of;
   a history of one or more types of content items which authors historically interact with;
   one or more source devices; or
   one or more IP address or ranges of IP addresses.

3. The method of claim 1 wherein obtaining, based on the received post parameters, two groups of posts is performed by:
   selecting the first group using the received one or more parameters; and
   selecting the second group as a random selection of posts.

4. The method of claim 1 wherein receiving post parameters comprises:
   receiving a first subset of the post parameters with corresponding parameter types;
   receiving an alternate parameter with a specified type matching one of the corresponding parameter types; and
   creating a second subset of the post parameters with of the parameters of the first subset except for the parameter of the first subset with the type matching the specified type replaced by the alternate parameter; and
   wherein obtaining, based on the received post parameters, two groups of posts is performed by:
      selecting the first group using the first subset of the post parameters; and
      selecting the second group using the second subset of the post parameters.

5. The method of claim 1 wherein the first group topics and the second group topics are each an n-gram of no more than a specified number of words.

6. The method of claim 1 wherein a rank score, of the first rank scores, for a selected topic is computed by:
   computing a term frequency of the selected topic within the first group;
   computing an inverse document frequency of the selected topic within the first group; and
   computing the rank score for the selected topic as a product of the term frequency and inverse document frequency.

7. The method of claim 1 wherein the corresponding rank score is determined by:
   locating a matching topic from the second group topics, the matching topic corresponding to the selected one of the first group topics;
   wherein the corresponding rank score is the second rank score which was computed for the matching topic from the second group topics.

8. The method of claim 1 wherein the corresponding rank score is determined by:
   determining that the second group topics do not include a topic corresponding to the selected one of the first group topics; and
   in response to determining that the second group topics do not include the topic corresponding to the selected one of the first group topics, using a default value as the corresponding rank score.

9. The method of claim 1 further comprising:
   receiving an identification of a common language; and translating any of the first group topics and any of the second group topics which are not in the common language to be in the common language.

10. The method of claim 1 further comprising:
generating a common word list comprising topics that have the first rank score above a specified common threshold and the second rank score above the specified common threshold.

11. The method of claim 1 further comprising:
receiving a list of common topics determined to be too common to be useful as comparatively trending topics;
removing, from the first ranked list of topics, topics appearing on the list of common topics; and
removing, from the second ranked list of topics, topics appearing on the list of common topics.

12. A non-transitory computer-readable storage medium storing instructions configured to, when executed by a computing system, cause the computing system to perform operations for identifying comparatively trending topics, the operations comprising:
receiving, as post parameters, one or more parameters that distinguish social media postings;
obtaining, over a network and based on the received post parameters, at least two groups of posts;
generating, for each selected group of posts of the at least two groups of posts, a corresponding ranked list of topics by:
identifying topics from the selected group of posts wherein each identified topic comprises one or more words; and
computing a rank score for each of the identified topics;
associating, with an individual topic from a selected one of the corresponding ranked lists, a difference score computed as a difference between:
the rank score for the individual topic from the selected one of the corresponding ranked lists, and
a rank score for the individual topic computed from one or more of the ranked lists other than the selected one of the corresponding ranked lists;
comparing the difference score to a specified threshold;
in response to determining that the difference score is above the specified threshold, identifying the individual topic as a comparatively trending topic.

13. The non-transitory computer-readable storage medium of claim 12 wherein the post parameters comprise at least one of:
one or more keywords;
one or more topics;
one or more times or time frames;
author age or author age range;
one or more author genders; or
one or more author locations.

14. The non-transitory computer-readable storage medium of claim 12 wherein receiving post parameters comprises:
receiving a first subset of the post parameters with corresponding parameter types;
receiving an alternate parameter with a specified type matching one of the corresponding parameter types; and
creating a second subset of the post parameters with of the parameters of the first subset except for the parameter of the first subset with the type matching the specified type replaced by the alternate parameter; and
wherein obtaining, based on the received post parameters, at least two groups of posts is performed by:

selecting a first of the at least two groups of posts using the first subset of the post parameters; and
selecting a second of the at least two groups of posts using the second subset of the post parameters.

15. The non-transitory computer-readable storage medium of claim 12 wherein a selected rank score for a selected topic, of the rank scores for each of the identified topics, is computed by:
computing a term frequency of the selected topic within a first of the at least two groups;
computing an inverse document frequency of the selected topic within the first of the at least two groups; and
computing the selected rank score as a product of the term frequency and inverse document frequency.

16. The non-transitory computer-readable storage medium of claim 12, wherein the operations further comprise:
receiving an identification of a common language; and
translating any of the posts of the least two groups of posts which are not in the common language to be in the common language.

17. The non-transitory computer-readable storage medium of claim 12, wherein the operations further comprise:
receiving a list of common topics determined to be too common to be useful as comparatively trending topics; and
removing, from each ranked list of topics, topics appearing on the list of common topics.

18. A computing system for identifying comparatively trending topics, comprising:
one or more processors;
a memory;
an input configured to receive, as post parameters, one or more parameters that distinguish social media postings;
a transceiver configured to obtain, based on the received post parameters, two groups of posts;
a group builder configured to:
generate a first ranked list of topics for a first group of the two groups of posts by:
identifying, as first group topics, topics from the first group of posts wherein members of the first group topics each comprise one or more words; and
computing a first rank score for each of the topics of the first group topics; and
generate a second ranked list of topics for a second group of the two groups of posts by:
identifying, as second group topics, topics from the second group of posts wherein members of the second group topics each comprise one or more words; and
computing a second rank score for each of the topics of the second group topics;
a ranked topic list creator configured to associate, with a selected one of the first group topics, a difference score computed as a difference between:
the rank score for the selected one of the first group topics from the first ranked list of topics, and
a corresponding rank score determined based on the second ranked list of topics; and
a comparatively trending topic identifier configured to:
compare the difference score to a specified threshold; and
in response to determining that the difference score is above the specified threshold, identify the selected one of the first group topics as a comparatively trending topic.

19. The system of claim 18 wherein the corresponding rank score is computed by:
- locating a matching topic from the second group topics, the matching topic corresponding to the selected one of the first group topics; and
- using as the corresponding rank score the second rank score which was computed for the matching topic from the second group topics.

20. The system of claim 18 wherein the input receives the post parameters by:
- receiving a first subset of the post parameters with corresponding parameter types;
- receiving an alternate parameter with a specified type matching one of the corresponding parameter types; and
- creating a second subset of the post parameters with of the parameters of the first subset except for the parameter of the first subset with the type matching the specified type replaced by the alternate parameter; and
- wherein the two groups of posts are selected by:
    - selecting the first group using the first subset of the post parameters; and selecting the second group using the second subset of the post parameters.

* * * * *